United States Patent [19]

Couch

[11] 4,286,460

[45] Sep. 1, 1981

[54] WIND TUNNEL SUPPLEMENTARY MACH NUMBER MINIMUM SECTION INSERT

[75] Inventor: Lana M. Couch, Mathews, Va.

[73] Assignee: The United States of America as represented by the Administrator of the National Aeronautics and Space Administration, Washington, D.C.

[21] Appl. No.: 135,040

[22] Filed: Mar. 28, 1980

[51] Int. Cl.³ .............................................. G01M 9/00
[52] U.S. Cl. ....................................................... 73/147
[58] Field of Search ........................................... 73/147

[56] References Cited

U.S. PATENT DOCUMENTS 3,011,341  12/1961  Hill ........................................ 73/147

FOREIGN PATENT DOCUMENTS 712706  10/1941  Fed. Rep. of Germany ............. 73/147

*Primary Examiner*—Donald O. Woodiel
*Attorney, Agent, or Firm*—Howard J. Osborn; John R. Manning; Wallace J. Nelson

[57] ABSTRACT

The invention relates to a device which changes the Mach number capability of a wind tunnel without permanently altering the existing nozzle of the tunnel. An insert (14) is removably attached to the wall (17) of the existing nozzle expansion area (22) thereby creating a second minimum section (15) upstream of the model test section (21). The added insert (14) may be removed without complicated and expensive changes to the basic wind tunnel. In the embodiment illustrated in FIG. 2, a removable insert (25) is disposed within wind tunnel nozzle walls (17) with a portion of the flow boundary layer being bled off from the tunnel via passageway (29) and tunnel exit (28) to thereby reduce the extent of separated flow normally occuring upstream of the insert contraction section.

5 Claims, 2 Drawing Figures

WIND TUNNEL SUPPLEMENTARY MACH NUMBER MINIMUM SECTION INSERT

ORIGIN OF THE INVENTION

The invention described herein was made by an employee of the United States Government and may be manufactured and used by or for the Government for governmental purposes without the payment of any royalties thereon or therefor.

BACKGROUND

Wind tunnels are tubelike structures or passages in which a high-speed wind or gas stream is produced and within which objects such as engines, aircraft, airfoils, rocket missiles or scale models of these objects are placed to investigate the air flow about them and the aerodynamic forces acting upon them. Wind tunnels are designed to simulate forces acting on the test object to which the full size object would be subjected if it were in actual flight.

Most wind tunnel nozzles create a high speed gas stream by supplying a compressed gas, usually air, to a converging-diverging nozzle which accelerates and expands the pressurized gas and forms it into a high speed gas stream. The converging-diverging nozzle usually comprises an inlet section whose cross-sectional area decreases in the direction of flow through the nozzle, and a diverging outlet section, usually of relatively great length, whose cross-sectional area increases in the direction of flow through the nozzle, with a "throat" joining the converging and diverging sections.

As is well known in the high speed gas dynamic art, the speed ultimately attained by the gas accelerated in a well-designed converging-diverging nozzle depends upon the "area ratio" of the nozzle, that is, the ratio of the cross-sectional area of the nozzle passageway at its exit to the cross-sectional area at its throat. Thus, by preselecting the area ratio of the nozzle, the ultimate speed of the gas can be made "transonic" (slightly greater or less than Mach 1, or the speed of sound in air), or "supersonic" (substantially greater than Mach 1), or "hypersonic" (very much greater than Mach 1).

The construction of wind tunnels is expensive and involves elaborate and sophisticated technology. With the supersonic and hypersonic tunnels, the area ratio of the nozzle must be made extremely large in order to produce the desired wind speeds. A large area ratio usually is attained by making the throat area as small as possible rather than by making the exit area larger. This is done in order to make the wind tunnel test section of reasonable size and as inexpensive as possible, and in order to minimize the quantity of gas flow through the nozzle and thus minimize the required capacity of the system used to supply compressed gas to the wind tunnel.

To maximize the area ratio of the nozzle, the cross-sectional area at the throat can be minimized. The throat area is minimized by making the passage connecting the converging and diverging sections as small as possible. Often, the throat height or spacing will be only a few hundredths of an inch. With such minute spacings, the slightest deformation of the throat structure is likely to cause substantial distortion of the gas stream. Consequently, most wind tunnels are designed with nozzles which are relatively immutable.

If the cross-sectional area of the throat section cannot be changed, then the ultimate Mach number capability of the wind tunnel cannot be varied. However, researchers often wish to test aerodynamic models at variable Mach numbers. Thus, designers have sought ways to change the cross-sectional area of the throat section to provide supplementary Mach numbers without sacrificing the precision of the wind tunnel performance characteristics.

PRIOR ART

Previous methods for providing additional Mach numbers in a fixed nozzle wind tunnel have included either (1) changing the area of the original first minimum section plus recontouring the original nozzle to provide the area ratio required for the desired test section Mach number, or (2) recontouring the original nozzle plus changing the original nozzle exit area to provide the area ratio required for the desired test section Mach number.

With either method, the first minimum section has to be designed either to be replaceable with a first minimum section of different dimensions, or the design must provide a means of adjusting the area ratio and contouring of the nozzle. These prior art methods entail numerous disadvantages. First, replacement of the original first minimum section and contoured nozzle usually is an excessively expensive operation. Second, increasing the original throat diameter to lower the Mach number would result in a much longer nozzle than a typical lower-Mach-number nozzle. Therefore, boundary layer would have a longer distance to grow and would be much thicker than usual for that Mach number and would occupy a large portion of the test section area. This decreases the diameter of uniform flow in the test section, and thereby, decreases the maximum model size that can be tested. Third, any change of Mach numbers would require considerable time, thereby decreasing the efficiency of the testing procedure. Fourth, the replaceable nozzle system can adversely affect the ability to sustain or even start a combustion process in a combustion wind tunnel. Fifth, with a system using an adjustable first minimum section, not only would the installation cost probably be prohibitive, but also the increased mechanical complexity of any device designed to vary the area ratio of the nozzle would necessarily increase the probability of malfunction and distortion of the high speed gas stream. Finally, maintenance of such a system would be costly and time consuming.

Thus, a need continues to exist for an inexpensive wind tunnel system providing variable Mach numbers in a fixed nozzle wind tunnel.

Accordingly, it is an object of the present invention to provide a means for quickly and inexpensively changing the Mach number capability of a wind tunnel.

Another object of the present invention is to provide a device which can vary the Mach number capability of a wind tunnel without altering the original wind tunnel structure.

These and other objects are accomplished by the present invention by using an insert positioned in the nozzle expansion area to create a second minimum section. The insert comprises a converging inlet area and a diverging exit area and can be quickly attached or removed. Unlike the prior art methods, the basic structure of the wind tunnel nozzle is never altered.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein.

DETAILED DESCRIPTION OF THE INVENTION

Figure 1:
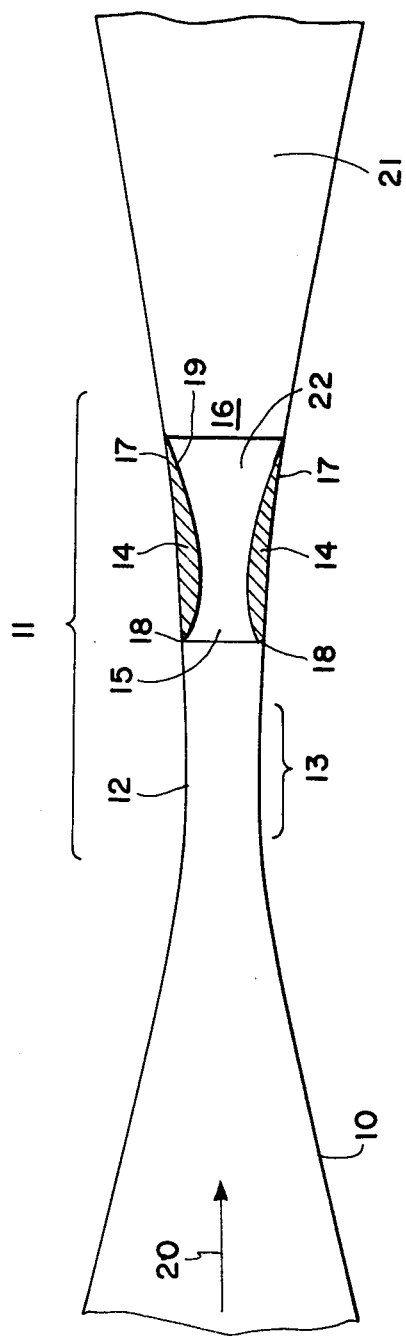
FIG. 1 is a section view of the preferred embodiment of a wind tunnel nozzle insert according to the present invention.

Referring now to FIG. 1, there is shown a wind tunnel 10 having a throat 12 and a nozzle 11. An insert 14 is removably attached by bolts (not shown) to nozzle exit area walls 17, with conventional seals provided between the bolts and bolt holes to prevent leakage. Insert 14 comprises a contoured contraction section 18 and a contoured expansion section 19. Insert 14 can be made of various materials depending on the gas energy level, that is, the combined temperature-pressure effect, of the wind tunnel. For example, with a low energy tunnel, aluminum, fiberglass-covered wood or wood would be suitable while in a high energy tunnel, steel, nickel, or a metal covered with a ceramic coating would be preferable. Finally, for a very high energy tunnel, a high temperature resistent metal, an actively cooled metal, or a metal covered with a ceramic coating could be used. With a high energy tunnel, the bolt attachment points would be designed to accommodate the expansion of the insert material. Insert 14 may be of unitary or sectional construction. However, in the preferred embodiment, insert 14 would be manufactured in two or more sections to facilitate attachment to the wind tunnel wall.

In the operation of a typical wind tunnel, a high speed gas stream enters nozzle 11 passing downstream through first minimum section 15 toward nozzle exit area 16 as shown by the flow arrow indicated by numeral 20. Conventionally, the Mach number of the gas stream at throat 12 is equal to one. Nozzle 11 has an expansion section which accelerates the gas stream to a higher Mach number at the model test section. By attaching the second minimum section insert 14 to the nozzle expansion area walls 17, the conventional expansion of the gas stream downstream of first minimum section 13 is terminated and the velocity of the gas stream is reduced. Contoured contraction section 18 of insert 14 functions to decelerate and direct the gas stream through second minimum section designated by reference numeral 15. Once the gas stream emerges from second minimum section 15, it passes through contoured expansion section 19 which is designed to cancel spurious shock waves and conventionally accelerate the gas stream to the Mach number desired at model test section 21. The dimension, shape and location of insert 14, as well as the minimum diameter of the passage of second minimum section 15, depend on the Mach number desired in model test section 21, and the existing nozzle exit area Mach number and Mach number development rate with distance along nozzle 11.

Insert 14 can restrict the flow of the gas stream sufficiently to reduce the Mach number of the gas stream at second minimum section 15 to a value greater than one but less than the Mach number desired at model test section 21. The desired Mach number would then be attained by conventional expansion of the gas stream through contoured expansion section 19.

Alternatively, insert 14 can restrict the flow of the gas stream sufficiently to produce Mach one at second minimum section 15. Conventional expansion of the gas stream provided by contoured expansion section 19 would then accelerate the gas stream to the desired Mach number at model test section 21.

In a specific example of the first alternative, an eight-foot hypersonic wind tunnel with a fixed nozzle 11 having an area ratio of essentially 104:1 (area of nozzle exit to nozzle throat area) typically would provide a nominal Mach number of seven at model test section 21 before the addition of insert 14. Once insert 14 is attached to nozzle expansion area walls 17, the Mach number just upstream of insert 14 where the flow is decelerated by second minimum section 15, would be about four. After passage through second minimum section 15, the gas stream accelerates through insert expansion area 22 to model test section 21 where the Mach number would be about five. Thus, installation of insert 14 reduces the nominal Mach number at model test section 21 from seven to five without altering fixed nozzle 11. Different inserts would be employed for each desired Mach number in a specific tunnel.

Figure 2:
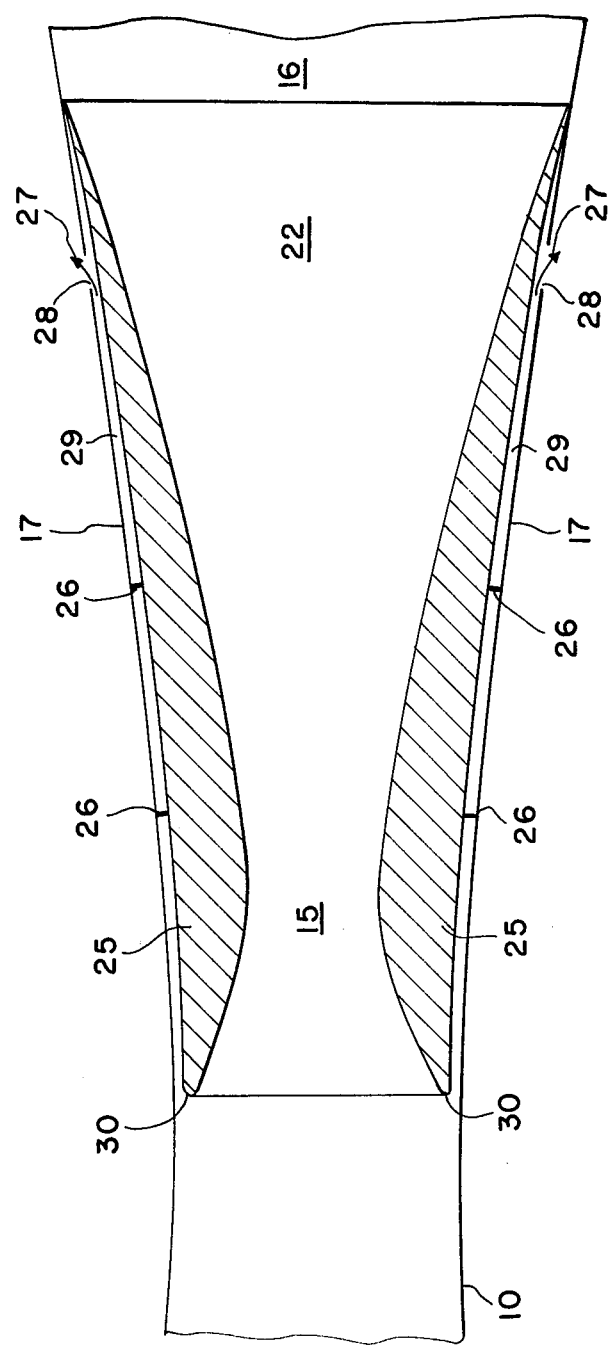
FIG. 2 is a section view of a nozzle insert according to the present invention and mounted in spaced relationship with the wind tunnel wall.

Referring now more particularly to FIG. 2, there is shown an embodiment of the invention in which contoured insert 25 is attached by bolts (not shown) extending through metal or other temperature resistent cylinders or spacers 26 for securing insert 25 to nozzle expansion area walls 17 but while also serving to maintain a terminated passageway 29 between insert 25 and nozzle expansion area walls 17. As air flow passes through nozzle 11, boundary layer thickness develops. This boundary layer flows through passageway 29 from which it is removed from wind tunnel 10 through exit passageway 28 as shown by flow arrow 27. Bleeding off the boundary layer can reduce the extent of separated flow that would occur immediately upstream of insert contraction section 30. Insert 25 is contoured on all sides to accommodate both the flow through second minimum section 15 and the flow through passageway 29.

The illustrations described herein are intended merely as illustrations of possible embodiments of the invention. The invention is not limited thereby and many modifications and variations thereof will be readily apparent to those skilled in the art without departing from the spirit and scope of the instant invention.

What is claimed as new and desired to be secured by Letters Patent of the United States is:

1. In combination with a wind tunnel having a nozzle with a first minimum section and a nozzle expansion area having walls, an apparatus for providing supplementary wind tunnel Mach numbers, said apparatus comprising a second minimum section insert releasably attached to said walls of said nozzle expansion area of said wind tunnel.

2. An apparatus as in claim 1, whereby said second minimum section insert releasably attached to said walls of said nozzle expansion area comprises a contoured contraction section, a contoured expansion section, and a minimum area passage connecting said contoured contraction section with said contoured expansion section.

3. An apparatus as in claim 1, whereby said second minimum section insert is contiguous with said walls of said nozzle expansion area.

4. An apparatus as in claim 1, whereby said second minimum section insert is spaced from said walls of said nozzle expansion area thereby providing a terminated passageway between said second minimum section insert and said walls of said nozzle expansion area, and means for bleeding off wind tunnel flow between said insert and said walls.

5. A method for varying the Mach number capability of a wind tunnel which comprises:
  providing a wind tunnel having a nozzle with a first minimum section and a nozzle expansion area having walls;
  providing a releasably attachable second minimum section having a contoured converging and contraction section, a contoured diverging and expansion section, and a minimum area passage connecting the contraction section with the expansion section;
  adjusting the diameter of the passage connecting the contraction section with the expansion section of the second minimum section insert relative to the nozzle exit area to provide a desired Mach number capability;
  positioning the insert on the walls of the nozzle expansion area relative to the nozzle to provide a desired Mach number capacity; and
  providing a flow of gas through the first minimum section of the nozzle and through the second minimum section insert, whereby the Mach number of the gas stream at the nozzle exit area is determined by its passage through the second minimum section insert.

* * * * *